United States Patent [19]

Ellenberger

[11] Patent Number: 5,398,173
[45] Date of Patent: Mar. 14, 1995

[54] HEADLAMP ADJUSTER WITH STAMPED GEAR

[75] Inventor: Eddie D. Ellenberger, Wausau, Wis.
[73] Assignee: Elco Industries, Inc., Rockford, Ill.
[21] Appl. No.: 185,264
[22] Filed: Jan. 24, 1994
[51] Int. Cl.[6] .............................................. B60Q 1/06
[52] U.S. Cl. ...................... 362/66; 362/424; 362/273
[58] Field of Search ............ 362/66, 424, 428, 273; 29/893.33

[56] References Cited

U.S. PATENT DOCUMENTS

| | | | |
|---|---|---|---|
| 1,847,926 | 3/1932 | Chase | 29/893.33 |
| 4,674,018 | 6/1987 | Ryder et al. | 362/66 |
| 4,703,399 | 10/1987 | Van Duyn et al. | 362/66 |
| 5,165,775 | 11/1992 | Lisak et al. | 362/66 |
| 5,321,590 | 6/1994 | Wu | 362/66 |

OTHER PUBLICATIONS

Elco Industries, Inc. Drawing No. CSG-165-11-99, dated Oct. 20, 1992.

Primary Examiner—Ira S. Lazarus
Assistant Examiner—Sara Sachie Raab
Attorney, Agent, or Firm—Leydig, Voit & Mayer, Ltd.

[57] ABSTRACT

A device for adjusting the position of a vehicular headlamp includes a gear which, when rotated, effects linear movement of a link to adjust the headlamp. The gear is stamped from sheet metal and includes a flange with angularly spaced and axially extending teeth. A manually adjustable actuator rod is rotatably supported by the housing of the adjusting device and includes angularly spaced teeth which are adapted to drivingly engage the teeth of the gear in order to rotate the gear when the actuator rod is turned.

8 Claims, 2 Drawing Sheets

HEADLAMP ADJUSTER WITH STAMPED GEAR

BACKGROUND OF THE INVENTION

This invention relates generally to an adjuster for changing the position of a vehicular headlamp component for purposes of properly aiming the beam of the headlamp. A typical headlamp adjuster is disclosed in Ryder et al U.S. Pat. No . 4,674,018.

Many headlamp adjusters, such as that of the Ryder et al patent, utilize a pair of coacting bevel gears, one of which is adapted to be turned manually by an actuating rod and the other of which acts through a link to effect adjustment of the headlamp component. The gears are either die cast or are injection molded.

A less expensive headlamp adjuster uses a single and lower cost gear which is stamped from sheet metal. Adjustment is effected by inserting the tip of a Phillips screwdriver or similar tool between adjacent teeth of the gear and by turning the tool to cause rotation of the gear and adjustment of the headlamp component.

The need for using a screwdriver or other loose tool to directly rotate the stamped gear presents certain problems in that it may not be readily apparent to a mechanic as to how or by what means the gear is to be adjusted. Also, it may be difficult to gain access to the gear with a screwdriver and to prevent wobbling of the screwdriver while the screwdriver and the gear are being turned. In certain cases, it is desirable for the adjuster to be tamper-resistant (i.e., not capable of being adjusted by the vehicle owner) and this objective cannot be attained if the gear may be rotated by a commonly available screwdriver.

SUMMARY OF THE INVENTION

The general aim of the present invention is to overcome the aforementioned problems of a stamped gear headlamp adjuster by providing an adjuster having a self-contained actuator for turning the stamped gear.

A related object of the invention is to provide a rotary actuator which is permanently supported by the housing of the adjuster and which includes a specially formed tip for turning the stamped gear.

A more detailed object is to provide an actuator having a relatively simple and inexpensive one-piece plastic housing for enclosing the stamped gear and for rotatably supporting the actuator, the gear coacting with the actuator to hold the latter in assembled relation with the housing.

The invention also resides in the unique construction of the housing enabling quick and easy assembly of the components of the adjuster.

These and other objects and advantages of the invention will become more apparent from the following detailed description when taken in conjunction with the accompanying drawings.

Figure 1:
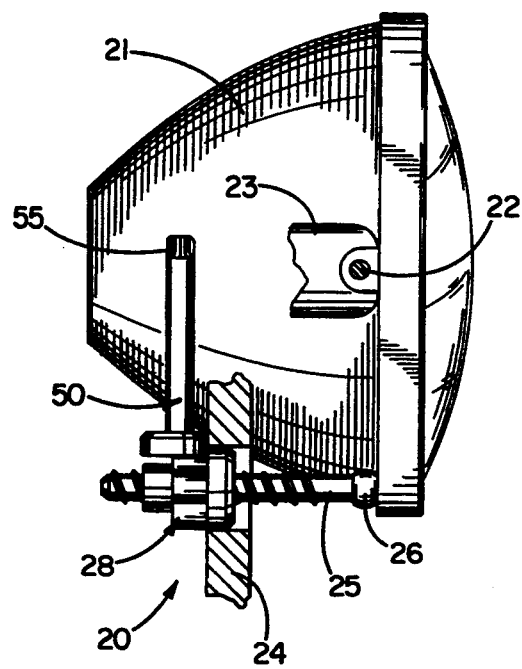
FIG. 1 is a side elevational view of one type of vehicular headlamp assembly equipped with a new and improved adjuster incorporating the unique features of the present invention.

While the invention is susceptible of various modifications and alternative constructions, a certain illustrated embodiment hereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DETAILED DESCRIPTION OF THE PREFERRED EMBODIMENT

For purposes of illustration, the invention has been shown in the drawings as embodied in a device 20 for adjusting a vehicle headlamp assembly 21 in order to align the headlamp assembly properly with respect to the vehicle. The headlamp assembly is of typical modern construction in which high and low beam replaceable bulbs are mounted in a single housing adapted to be adjusted from the interior of the engine compartment.

The headlamp assembly 21 itself may be mounted in various ways and, for purposes of simplicity, the assembly has been illustrated only diagrammatically in FIG. 1. Thus, the assembly has been shown as being supported to swing upwardly and downwardly about a generally horizontal pivot 22 on a fixed frame part 23 of the vehicle. Another fixed frame part 24 is located behind the headlamp assembly and supports the adjusting mechanism 20. The latter normally holds the headlamp assembly in a fixed position about the pivot 22 but may be adjusted to change the vertical tilt of the assembly.

Connected to the headlamp assembly 21 is a link 25 which forms part of the adjusting mechanism 20 and which, when moved linearly back and forth, serves to rock the headlamp assembly about the pivot 22 in order to change the vertical tilt of the assembly. Herein, the link is in the form of an elongated and generally cylindrical rod. Formed integrally with the forward end of the link is a generally spherical head 26 adapted to be received within a generally spherical seat (not shown) of the headlamp assembly in order to connect the link to the headlamp while allowing the headlamp to rock about the pivot 22 as well as about a vertically extending pivot axis. The spherical head and seat coact in a known manner to prevent the link 25 from rotating about its own axis but it should be appreciated that other means may be employed to constrain rotation of the link.

Figure 2:
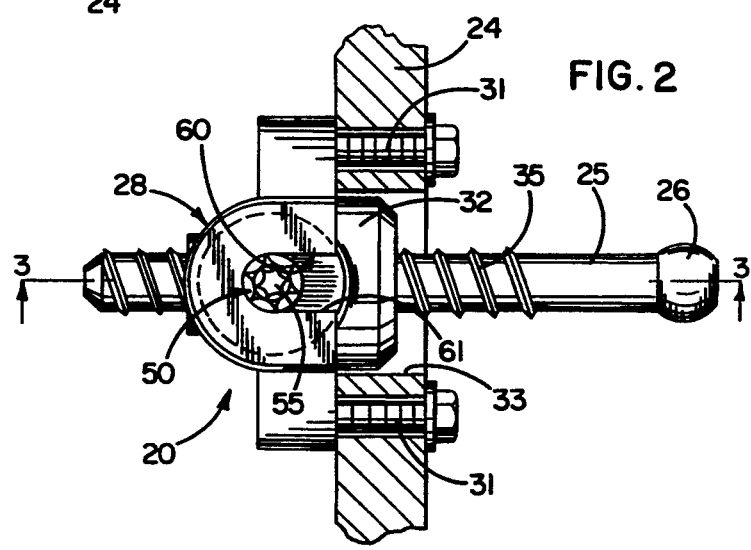
FIG. 2 is an enlarged top plan view of the adjuster, certain parts being broken away and shown in section.

The link 25 is supported to move linearly back and forth relative to a plastic housing 28 which is formed with front and rear bores 29 and 30 (FIG. 3) for receiving the link with a snug but slidable fit. Herein, the housing is secured to the rear side of the frame part 24 by screws 31 (FIG. 2) and is formed with a generally cylindrical nose 32 which fits into an opening 33 in the frame part. The front bore 29 is formed through the nose.

Figure 3:
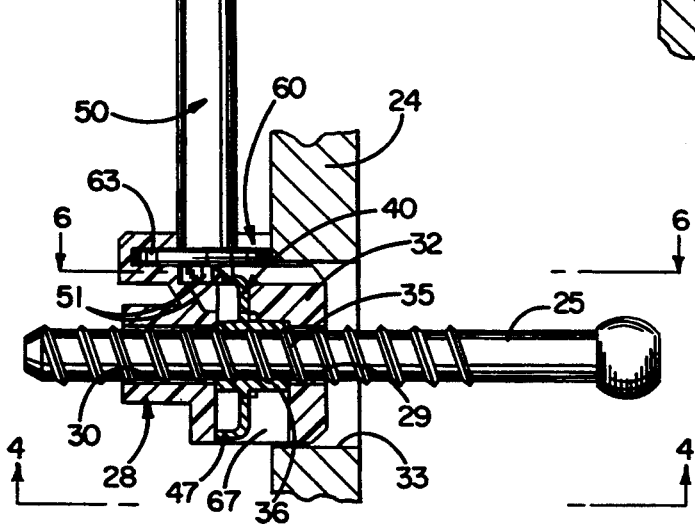
FIG. 3 is a fragmentary cross-section taken substantially along the line 3—3 of FIG. 2.
Figure 4:
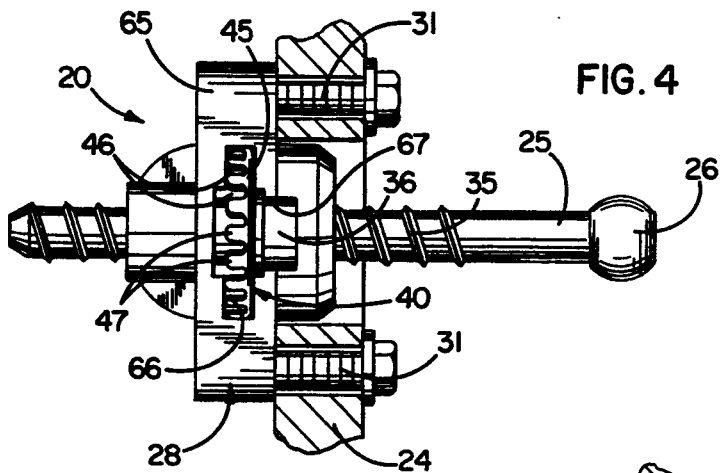
FIG. 4 is a bottom view of the adjuster as seen along the line 4—4 of FIG. 3, certain parts being broken away and shown in section.

As shown most clearly in FIG. 3, the rear end portion of the link 25 is formed with a thread 35. A tubular bushing 36 is threaded onto the rear end portion of the link and is rotatably supported in the housing 28. The bushing preferably is molded of plastic and may either be preformed with a molded or tapped internal thread or may be threaded by a cutting action when the link is first screwed through the bushing. When the bushing is rotated, the link is advanced or retracted to adjust the headlamp 21.

Figure 5:
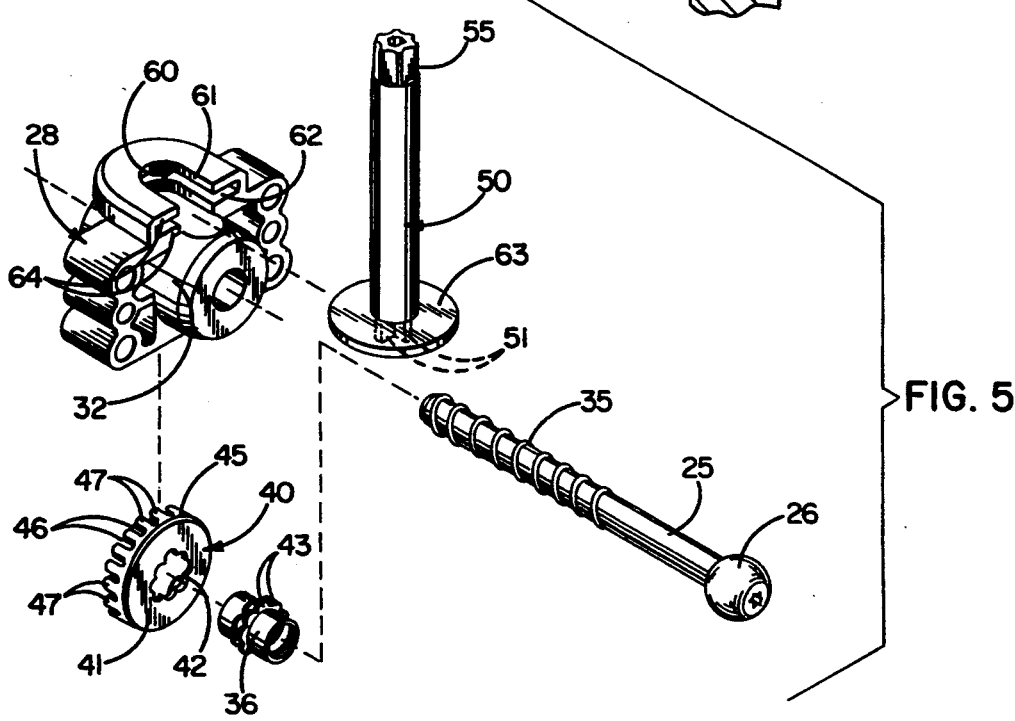
FIG. 5 is an exploded perspective view of the components of the adjuster.

To enable rotation of the bushing 36, provision is made of a relatively simple and inexpensive gear 40 (FIGS. 3–6) which preferably is stamped from sheet metal. Herein, the gear includes a radially extending plate 41 (FIG. 5) having a central opening 42 whose edge is scalloped to coact with radially projecting lobes 43 on the bushing and connect the gear and the bushing for rotation in unison. The lobes are formed about midway between the ends of the bushing and project radially outwardly therefrom. Other means, however, could be used to couple the gear non-rotatably to the bushing.

In addition to the plate 41, the gear 40 includes a flange 45 (FIG. 5) formed integrally with and projecting axially from the outer periphery of the plate. Angularly spaced notches or spaces 46 are formed through the flange and open axially out of the rear end of the flange so as to cause angularly spaced and axially projecting teeth 47 to be formed on the flange.

Figure 6:
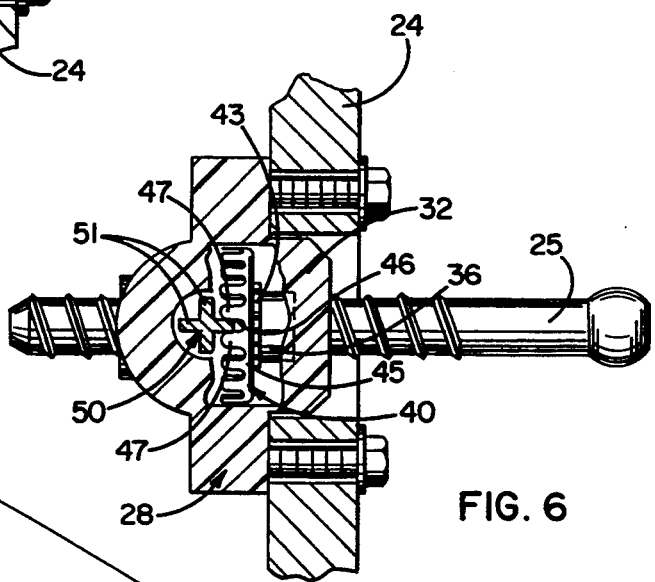
FIG. 6 is a fragmentary cross-section taken substantially along the line 6—6 of FIG. 3.

In accordance with the present invention, the housing 28 supports a manually operable actuator 50 which coacts with the teeth 47 of the stamped gear 40 to rotate the gear and the bushing 36 and thereby effect linear adjustment of the link 25. Herein, the actuator 50 is in the form of a generally cylindrical rod which is rotatably supported by the housing 28 to turn about an axis extending generally perpendicular to the axis of the link 25. The lower end of the actuator rod 50 is formed with four angularly spaced teeth 51 (FIG. 6) having a pitch correlated with the pitch of the gear teeth 47. Normally, one tooth 51 of the rod 50 is located in a space 46 between two adjacent teeth 47 of the gear 40 as shown in FIG. 6. When the rod is turned, successive ones of its teeth 51 enter successive spaces 46 of the gear and drivingly engage the teeth 47 thereof so as to rotate the gear and the bushing 36. In order to enable turning of the rod, the upper end thereof preferably is formed with a specially configured driving head 53 (FIG. 5) which is adapted to mate only with a specially designed driving tool. As a result, the adjusting device 20 is tamper-resistant in that the owner of the vehicle is prevented from turning the rod and misadjusting the headlamp 21.

Advantageously, the housing 28 and the other components of the adjuster 20 are constructed so as to enable the use of a single-piece housing and avoid the expense of producing and assembling two housing parts. For this purpose, the upper end portion of the housing 28 is formed with a generally U-shaped slot 60 (FIGS. 2 and 5) which opens forwardly out of the housing. The slot is generally T-shaped in cross-section and includes an upper narrow portion 61 (FIG. 5) whose width is substantially equal to the diameter of the rod 50. In addition, the slot includes a wider lower portion 62 having a lateral width approximately equal to the diameter of a circular plate 63 formed on the lower end portion of the rod 50 immediately above the teeth 51, the plate preferably being formed by a cold heading operation. The wide portion 62 of the slot 60 is defined by the vertically facing surfaces of a pair of vertically spaced upper and lower walls 64 whose laterally facing edges define the narrow slot portion 61.

With the foregoing arrangement, the actuator rod 50 may be assembled with the housing 28 simply by moving the rod radially into the forwardly opening end of the U-shaped slot 60 to cause the rod to enter the narrow portion 61 of the slot and to cause the plate 63 to enter the wide portion 62 of the slot. The slot 60 serves to rotatably support the actuator rod 50 while captivating the rod axially relative to the housing 28.

After the actuator rod 50 has been assembled with the housing 28 in the manner described above, the bushing 36, with the gear 40 attached thereto, is slipped upwardly into the housing from the bottom thereof. For this purpose, the bottom wall 65 (FIG. 4) of the housing is formed with a first opening 66 having a lateral width just slightly greater than the diameter of the gear 40 and having an axial dimension which closely approximates the axial dimension of the gear. In addition, the bottom wall 65 is formed with a second opening 67 having a lateral width just slightly greater than the diameter of the bushing 36 and extending forwardly and rearwardly from the opening 66. The overall length of the opening 67 is approximately equal to the length of the bushing.

By virtue of the openings 66 and 67, the assembly consisting of the bushing 36 and the gear 40 may be slipped upwardly into the housing 28 from the bottom wall 65 thereof. As an incident thereto, two adjacent teeth 47 of the gear slip into straddling relation with one of the teeth 51 of the rod 50. As shown most clearly in FIG. 3, the bushing and the gear are captivated axially by internal wall surfaces of the housing 28. As a result, the bushing and the gear are restricted from moving axially relative to the housing and thus the gear is captivated axially relative to the bushing so that the lobes 43 are held in driving engagement with the scalloped edge of the opening 42 in the gear. In addition, engagement of the gear with the tooth 51 of the actuator rod 50 captivates the latter against moving forwardly out of the U-shaped slot 60.

Assembly of the adjuster 20 is completed by inserting the link 25 into the bore 29 and by threading the link through the bushing 36 until the rear end of the link is well into or projects through the bore 30. The link 25 prevents the bushing 36 and the gear 40 from slipping downwardly out of the openings 66 and 67 and, as explained above, the gear coacts with the actuator rod 50 to prevent the rod from slipping forwardly out of the U-shaped slot 60.

From the foregoing, it will be apparent that the present invention brings to the art a new and improved headlamp adjuster 20 having a relatively inexpensive stamped gear 40 and having a self-contained actuator rod 50 for turning the gear. Because the actuator rod is part of the adjuster 20 itself and is clearly in view, a mechanic can readily ascertain how and where the gear is to be turned and can gain easy access to the rod. Being rotatably supported by the housing 28, the rod stays in perpendicular relation with the gear 40 during turning of the gear and does not wobble or come out of line. And, as pointed out above, the driving head 55 of the actuator rod makes the adjuster 20 tamper-resistant. The simple and inexpensive one-piece plastic housing of the adjuster is made possible by virtue of the manner in which the other components of the adjuster coact to maintain the components in assembled relation.

I claim:

1. A device for adjusting a headlamp component, said device comprising a housing, a non-rotatable adjusting link supported by said housing for back and forth linear movement along a predetermined axis and having a first end portion adapted to be connected to said headlamp component, said link having an externally threaded second end portion located in said housing, a gear rotatably supported in said housing and threadably connected to said second end portion of said link whereby rotation of said gear causes said link to move linearly relative to said housing and effect adjustment of said headlamp component, said gear comprising a disc coaxial with and projecting radially from said link, a circular flange formed integrally with and extending axially from the outer periphery of said disc, spaces formed in and spaced angularly around said flange and causing angularly spaced teeth to be defined on said flange, an elongated actuating rod supported by said housing to rotate about an axis extending substantially perpendicular to the axis of said link, a generally circular plate joined to and projecting radially from said rod, said housing having a relatively wide slot receiving said plate and having a narrower and generally U-shaped slot receiving said rod, said relatively wide slot having walls engageable with said plate to captivate said rod against axial movement relative to said housing, teeth formed integrally with and spaced angularly around said rod and adapted to successively enter said spaces in said flange during rotation of said rod whereby the teeth of said rod engage the teeth of said flange to effect rotation of said gear, and said gear engaging said rod to captivate said rod and said plate from moving radially out of said slots.

2. A device as defined in claim 1 in which said disc and said flange are stamped from a single piece of sheet metal.

3. A device as defined in claim 1 in which said housing is a one-piece plastic member.

4. A device as defined in claim 3 in which said housing has first and second opposite ends, said slots being formed adjacent the first end of said housing, opening means in the second end of said housing, said gear being insertable into said housing through said opening means.

5. A device as defined in claim 4 further including an internally threaded bushing connected to rotate with said gear and threadably connecting said gear to the second end portion of said link.

6. A device as defined in claim 5 in which said bushing also is insertable into said housing through said opening means.

7. A device for adjusting a headlamp component, said device comprising a one-piece plastic housing having first and second opposite ends, a non-rotatable adjusting link supported by said housing for back and forth linear movement along a predetermined axis and having a first end portion adapted to be connected to said headlamp component, said link having an externally threaded second end portion located in said housing, a gear rotatably supported in said housing and threadably connected to said second end portion of said link whereby rotation of said gear causes said link to move linearly relative to said housing and effect adjustment of said headlamp component, said gear comprising a sheet metal disc coaxial with and projecting radially from said link, a circular flange formed integrally with and extending axially from the outer periphery of said disc, spaces formed through and spaced angularly around said flange and causing angularly spaced teeth to be defined on said flange, an elongated actuating rod having a radially projecting and generally circular plate, said first end of said housing having a relatively wide slot receiving said plate and having a narrower and generally U-shaped slot receiving said rod, said relatively wide slot having walls engageable with said plate to captivate said rod against axial movement relative to said housing, said narrower slot supporting said rod to rotate about an axis extending substantially perpendicular to the axis of said link, teeth formed integrally with and spaced angularly around said rod and adapted to successively enter said spaces in said flange during rotation of said rod whereby the teeth of said rod engage the teeth of said flange to effect rotation of said gear, said gear engaging said rod to captivate said rod and said plate against moving radially out of said slots.

8. A device as defined in claim 7 further including an opening in the second end of said housing, said gear being insertable into said housing through said opening.

* * * * *